(12) United States Patent
Lee

(10) Patent No.: US 7,234,658 B2
(45) Date of Patent: Jun. 26, 2007

(54) PEPPER MILL

(76) Inventor: Tung Hsien Lee, No. 420, Lane 942, Dawan Rd., Yongkang City, Tainan County 710 (TW)

(*) Notice: Subject to any disclaimer, the term of this patent is extended or adjusted under 35 U.S.C. 154(b) by 0 days.

(21) Appl. No.: 11/395,234

(22) Filed: Apr. 3, 2006

(65) Prior Publication Data

US 2006/0261198 A1    Nov. 23, 2006

(30) Foreign Application Priority Data

May 18, 2005  (TW) .............................. 94208003 U

(51) Int. Cl.
*A47J 42/00* (2006.01)
(52) U.S. Cl. .................... 241/169.1; 241/258
(58) Field of Classification Search ................ 241/168, 241/169, 169.1, 258
See application file for complete search history.

(56) References Cited

U.S. PATENT DOCUMENTS 5,022,591 A * 6/1991 Sanders .................. 241/169.1
5,180,114 A * 1/1993 Chen ....................... 241/169.1
6,443,378 B1 * 9/2002 Huang et al. ............ 241/169.1
6,533,199 B2 * 3/2003 Wu ......................... 241/169.1
6,676,052 B2 * 1/2004 Wu ......................... 241/169.1
7,007,875 B2 * 3/2006 Cheng ..................... 241/169.1
2006/0006262 A1 * 1/2006 Gilberts .................. 241/169.1

* cited by examiner

*Primary Examiner*—Faye Francis
(74) *Attorney, Agent, or Firm*—Rosenberg, Klein & Lee

(57) ABSTRACT

A pepper mill including a hollow body having a through hole formed thereon, a clockwisely and counterclockwisely rotatable transmission unit mounted therein, and a grinding device mounted therein corresponding to the transmission unit. There is a base including a pivot having a free end inserted into the hollow body via the through hole and fixedly coupled to the transmission unit to enable the base and the hollow body to be pivotally rotatable, whereby the transmission unit is driven to perform a grinding action on the grinding device clockwisely and counterclockwisely.

4 Claims, 3 Drawing Sheets

PEPPER MILL

FIELD OF THE INVENTION

The present invention relates to a pepper mill, and more particularly to a pepper mill that grinds the peppercorns clockwisely and counterclockwisely.

BACKGROUND OF THE INVENTION

Many different types of commercial pepper mills are disclosed in, for example, Taiwan Pat. No. 416,299, U.S. Pat. Nos. 6,443,377, 6,443,378, and 6,830,205. The gear sets of these conventional pepper mills are composed of cone-shaped grinding blocks and grinding rings attached thereon, wherein the peppercorns are ground by the engagement motion between the respective protrudent gears of the cone-shaped grinding blocks and grinding rings. The above-mentioned engagement motion is performed only along arc-shaped tracks in a unitary direction since no reverse thread is formed on the cone-shaped grinding blocks and the grinding rings. In other words, if the conventional grinding blocks of the conventional pepper mills are rotated reversely, the grinding blocks cannot engage with the grinding rings. Therefore, the idle grinding blocks may be damaged easily by the friction between the grinding rings and the grinding blocks.

SUMMARY OF THE INVENTION

In view of the above-mentioned conventional drawbacks, a major object of the present invention is to disclose a pepper mill that grinds the peppercorns in double directions and avoids the problem of abrasion.

In order to achieve the object of the present invention, a pepper mill comprises a hollow body comprising a through hole formed thereon, a clockwisely and counterclockwisely rotatable transmission unit mounted therein, and a grinding device mounted therein corresponding to the transmission unit; and a base comprising a pivot having a free end inserted into the hollow body via the through hole and fixedly coupled to the transmission unit to enable the base and the hollow body to be pivotally rotatable, whereby the transmission unit is driven to perform a clockwise and counterclockwise grinding action on the grinding device.

DETAILED DESCRIPTION OF THE PREFERRED EMBODIMENT

The description taken with the drawings make the structures, features, and embodiments of the present invention apparent to those skilled in the art how the present invention may be embodied in practice.

Figure 3:
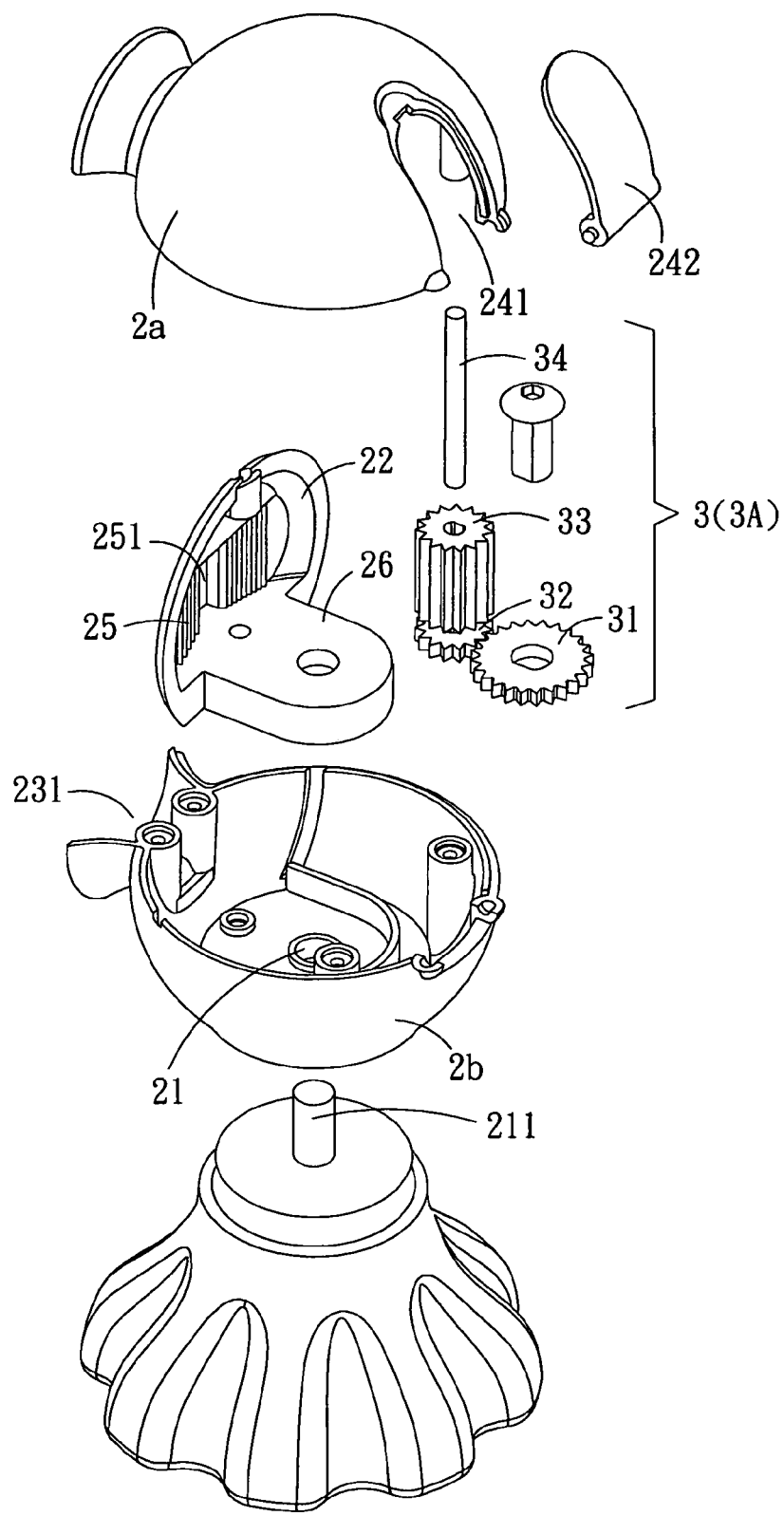
FIG. 3 is a three-dimensional exploded view of the present invention.
Figure 4:
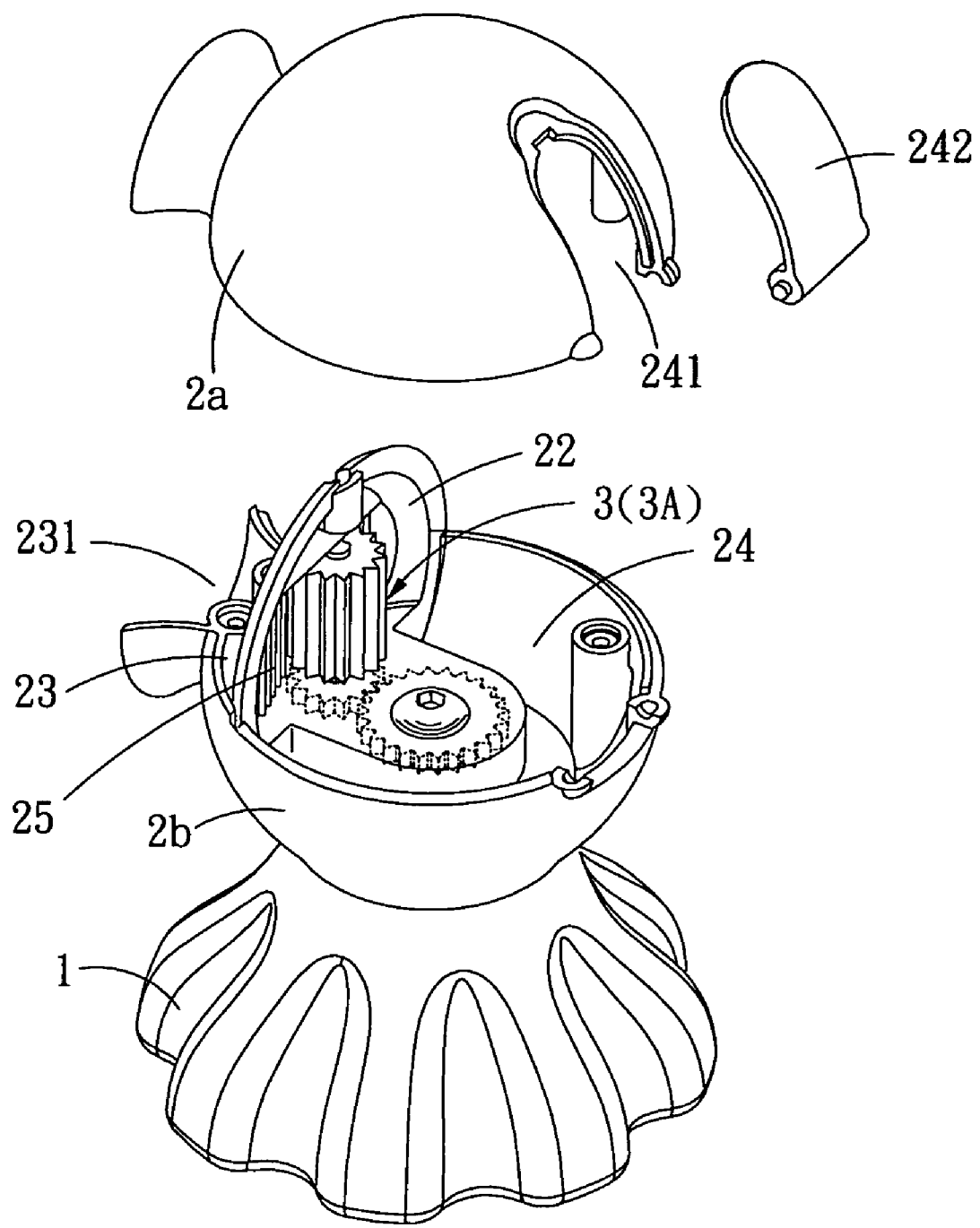
FIG. 4 is another three-dimensional exploded view of the present invention.

Referring to FIG. 3 and FIG. 4, a preferred embodiment of a pepper mill of the present invention is shown. The pepper mill comprises a base 1 and a hollow body 2. On the wall of the hollow body 2, a through hole 21 is formed. A pivot 211 is mounted on the base 1 by one end thereof to penetrate the through hole 21 such that the jointed hollow body 2 and base 1 are pivotally rotatable. A clockwisely and counterclockwisely rotatable transmission unit 3 is fixedly mounted on the other end of the pivot 211. By means of the pivotal rotation, the transmission unit 3 is driven to make a clockwise and counterclockwise grinding action.

In addition, a partition plate 22 is mounted inside the hollow body 2 for dividing the inside of the hollow body 2 into a first chamber 23 and a second chamber 24, wherein an outlet 231 is formed on the wall of the hollow body 2 in the first chamber 23. Besides, an inlet 241 is formed on the wall of the hollow body 2 in the second chamber 24. A liftable side cover 242 is pivotally attached to both sides of the inlet 241 so as to open or close the inlet 241. A grinding device 25 and a platform 26 are mounted on the wall of the partition plate 22 facing the second chamber 24, wherein a gap 251 is formed on the grinding device 25 corresponding to the outlet 231 formed in the first chamber 23. Besides, the hollow body 2 is formed by coupling an upper cover 2a with a lower cover 2b.

Referring again to FIG. 3 and FIG. 4, in the present invention, the transmission unit 3 is preferably a gear set 3A. The gear set 3A is mounted on the platform 26, and comprises a power gear 31, a transmission gear 32, and a grinding gear 33, wherein the power gear 31 is fixedly coupled with the pivot 211 of the hollow body 2. The transmission gear 32 is engaged with the power gear 31. A shaft 34 is fixedly mounted between the transmission gear 32 and the grinding gear 33. The power of the driven power gear 31 is transmitted from the transmission gear 32 to the grinding gear 33 for rotating the grinding gear 33, thereby grinding the peppercorns between the grinding gear 33 and the grinding device 25.

Figure 1:
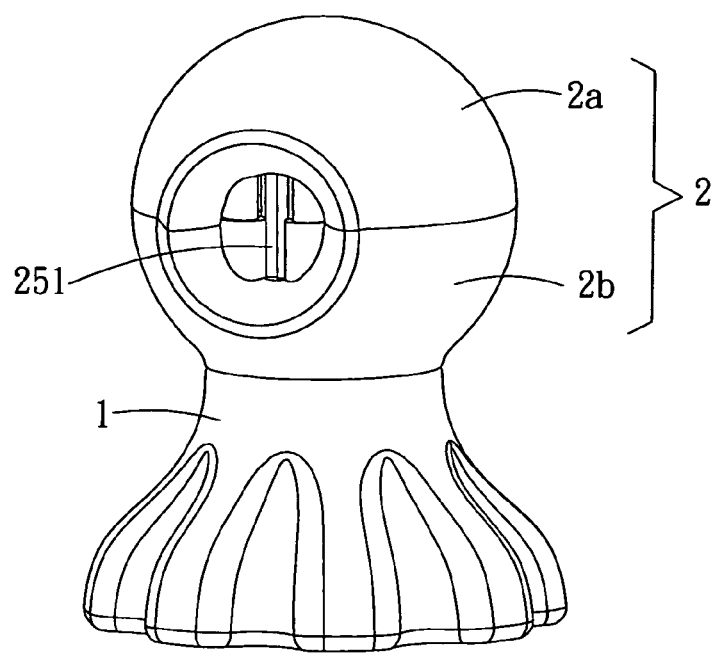
FIG. 1 is a three-dimensional view of the present invention.
Figure 2:
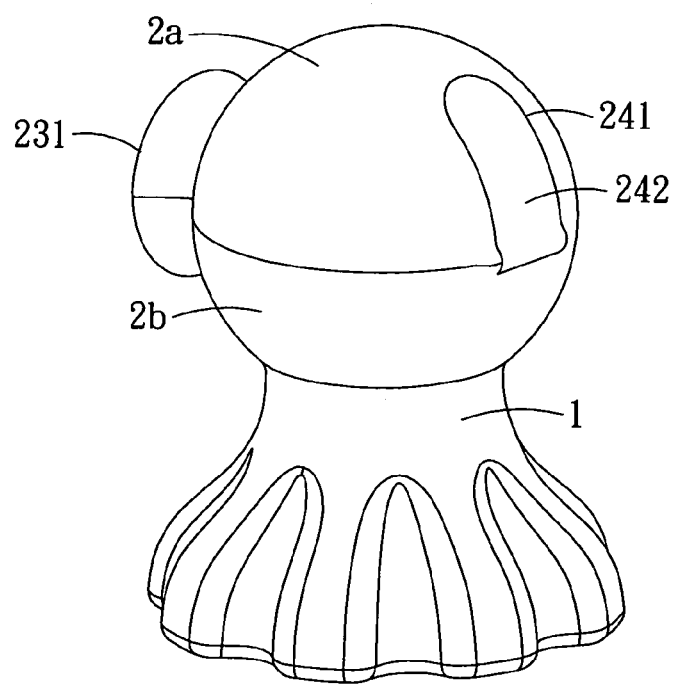
FIG. 2 is another three-dimensional view of the present invention.

Referring further to FIG. 1 and FIG. 2, when in operation, the peppercorns are added into the pepper mill from the inlet 241. Next, the base 1 is rotated so as to drive the grinding gear 33 for grinding the peppercorns located on the grinding device 25. The ground peppercorns can be poured out from the outlet 231.

In summary, the achievable efficacy of the present invention consists in that the pepper mill of the present invention overcomes the problems of the conventional unidirectionally rotatable structure by using the clockwisely and counterclockwisely rotatable transmission unit.

On the basis of the description mentioned above, the present invention indeed satisfies the requirements for patentability since it provides practicability and has never been published as a printed book or used publicly. Therefore, it is submitted for a patent.

With the invention thus explained, it is apparent that various modifications and variations can be made without departing from the scope of the invention. It is therefore intended that the invention be limited only as indicated in the appended claims.

What the invention claimed is:

1. A pepper mill comprising:
   a hollow body comprising a through hole formed thereon, a clockwisely and counterclockwisely rotatable transmission unit mounted therein, and a grinding device mounted therein corresponding to said transmission unit, wherein a partition plate is mounted inside said hollow body for dividing the inside of said hollow body into a first chamber and a second chamber, wherein an outlet is formed on a wall of said hollow body in said first chamber, an inlet is formed on said wall of said hollow body in said second chamber, and a liftable side cover is pivotally attached to both sides of said inlet so as to open or close said inlet; and a base comprising a pivot having a free end inserted into said hollow body via said through hole and fixedly coupled to said transmission unit to enable said base and said hollow body to be pivotally rotatable, whereby said transmission unit is driven to perform a grinding action on said grinding device clockwisely and counterclockwisely.

2. The pepper mill as claimed in claim 1, wherein said grinding device is mounted on a lateral surface of said partition plate facing said second chamber, a gap is formed on said grinding device corresponding to said outlet of said hollow chamber, and a platform is extended from said lateral surface of said partition plate under said grinding device.

3. The pepper mill as claimed in claim 2, wherein said transmission unit is a gear set mounted on said platform and comprises a power gear, a transmission gear, and a grinding gear, wherein said power gear is fixedly coupled with said pivot of said hollow body and engaged with said transmission gear, and a shaft is fixedly mounted between said transmission gear and said grinding gear.

4. The pepper mill as claimed in claim 1, wherein said hollow body is formed by coupling an upper cover with a lower cover.

\* \* \* \* \*